(12) United States Patent
Akimoto et al.

(10) Patent No.: US 8,656,337 B2
(45) Date of Patent: Feb. 18, 2014

(54) OPTIMIZATION METHOD AND DEVICE FOR NETLIST USED IN LOGIC CIRCUIT DESIGN FOR SEMICONDUCTOR INTEGRATED CIRCUIT

(71) Applicant: International Business Machines Corporation, Armonk, NY (US)

(72) Inventors: Tadaaki Akimoto, Kyoto (JP); Hirokazu Kubota, Shiga prefecture (JP); Masahiro Murakami, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/939,527

(22) Filed: Jul. 11, 2013

(65) Prior Publication Data

US 2014/0019922 A1    Jan. 16, 2014

(30) Foreign Application Priority Data

Jul. 13, 2012    (JP) ................................ 2012-157028

(51) Int. Cl.
    *G06F 17/50*    (2006.01)
(52) U.S. Cl.
    USPC ......................................... 716/132
(58) Field of Classification Search
    USPC ......................................... 716/132
    See application file for complete search history.

(56) References Cited

U.S. PATENT DOCUMENTS

| | | | |
|---|---|---|---|
| 6,609,244 B2 * | 8/2003 | Kato et al. | 716/104 |
| 7,236,006 B2 * | 6/2007 | Inui et al. | 326/38 |
| 8,065,645 B2 * | 11/2011 | Inui et al. | 716/113 |
| 2002/0157080 A1 * | 10/2002 | Kato et al. | 716/18 |
| 2005/0212578 A1 * | 9/2005 | Inui et al. | 327/199 |
| 2007/0234242 A1 * | 10/2007 | Inui et al. | 716/1 |
| 2011/0023004 A1 * | 1/2011 | Rao et al. | 716/136 |

FOREIGN PATENT DOCUMENTS

| | | | |
|---|---|---|---|
| JP | 2002157292 A | 5/2002 |
| JP | 2002163313 A | 6/2002 |
| JP | 2003186934 A | 7/2003 |
| JP | 2003273219 A | 9/2003 |
| JP | 200486763 A | 3/2004 |
| JP | 2005122298 A | 5/2005 |
| JP | 2005353079 A | 12/2005 |
| JP | 2006163822 A | 6/2006 |
| JP | 2007199951 A | 8/2007 |

* cited by examiner

*Primary Examiner* — Suchin Parihar
(74) *Attorney, Agent, or Firm* — Parashos Kalaitzis (57) ABSTRACT

A method, device, and article for assisting in the design of a logic circuit. The method can be such that: logic circuit description data is acquired, a first netlist is generated which is logically integrated with a first frequency based on the acquired logic circuit description data, and a second netlist is generated which is logically integrated with a second frequency higher than the first frequency based on the acquired logic circuit description data, logical operation elements and the wiring for the logical operation elements are arranged based on the first netlist, and a timing report is outputted which is related to the execution timing for each block divided into a predetermined wiring unit, and any block not satisfying the desired operational speed based on the outputted timing report is extracted, the first netlist is replaced with the second netlist for any extracted block, and placement and routing is performed.

9 Claims, 9 Drawing Sheets

```
//******************************************
// Input output
//******************************************
input         clk ;
input  [3:0]  x ;          301
input  [3:0]  y ;
output [5:0]  z_lt ;

//******************************************
// body
//******************************************
reg [3:0]   x_lt ;
reg [3:0]   y_lt ;
always @ (posedge clk) begin       302
      x_lt[3:0] <= x[3:0];
      y_lt[3:0] <= y[3:0];
end wire [5:0] z ;                             303
assign z[5:0]  = x_lt[3:0] * y_lt[3:0] ;

reg  [5:0]   z_lt;

always @ (posedge clk) begin       304
      z_lt[5:0] <= z[5:0];
end
```

```
Startpoint: (lt_reg) (rising edge-triggered flip-flop clocked by clk)
Endpoint: (lt_reg) (rising edge-triggered flip-flop clocked by clk)
Path Group: clk
Path Type: max Des/Clust/Port      Wire Load Model         Library
------------------------------------------------------------
sample_multi        200000_sq_um_8LBC4A     IBM_CU65HP_WLM Point                                          Incr        Path
------------------------------------------------------------
clock clk (rise edge)                          0.00        0.00
clock network delay (ideal)                    0.00        0.00
(lt_reg)/E  (D_LPG0001X1A12TH)                 0.00        0.00 r
  lt_reg_1/L2 (D_LPG0001X1A12TH)               0.17        0.17 r
U12/Y (AN02X1A12TH)                            0.12        0.29 r
mult_x_28_0/U12/S (ADDHX1A12TH)                0.14        0.42 r
mult_x_28_0/U5/CO (ADDFX1A12TH)                0.14        0.56 r
mult_x_28_0/U4/CO (ADDFX1A12TH)                0.15        0.71 r
mult_x_28_0/U3/CO (ADDFX1A12TH)                0.13        0.84 r
U9/Y (XNOR3X1A12TH)                            0.14        0.97 f
U21/Y (XNOR3X1A12TH)                           0.24        1.22 f
(lt_reg)/D  (D_LPG0001X1A12TH)                 0.00        1.22 f
data arrival time                                          1.22
......
```

51 — (Startpoint annotation)
52 — (Endpoint annotation)

Fig. 6

Fig. 7(b) Low Frequency

Fig. 7(c) High Frequency

OPTIMIZATION METHOD AND DEVICE FOR NETLIST USED IN LOGIC CIRCUIT DESIGN FOR SEMICONDUCTOR INTEGRATED CIRCUIT

This application claims priority under 35 U.S.C. §119 from Japanese Patent Application No. 2012-157028 filed Jul. 13, 2012, the entire contents of which are incorporated herein by reference.

BACKGROUND OF THE INVENTION

1. Field of the Invention

The present invention relates to a method for optimizing a netlist used in the logic circuit design of a semiconductor integrated circuit, a device for assisting in the design of a logic circuit using this method, and a computer program executable by this device.

2. Related Art

When a semiconductor integrated circuit is designed, the logic circuit is first described at the register transfer level (RTL) in a hardware description language (HDL), and a netlist is generated through logical synthesis using a cell library for the arrangement (logical operation element grouping).

However, when placement and routing is performed based on the netlist after logical synthesis and the timing is analyzed, unexpected critical paths sometimes occur due to clock cycles, input/output delays and so on. In other words, when a certain logical operation element becomes a critical path, a deviation occurs in the overall operational timing, and it can become difficult to execute a logical operation properly.

Therefore, in the prior art, a netlist is generated by performing logical synthesis under conditions in which a higher frequency is used to provide a margin. Simply put, the logical synthesis is performed using a higher frequency. Patent Literature 1 discloses a logical synthesis device in which timing verification is performed using the processing speed between FF as the standard.

SUMMARY OF THE INVENTION

One aspect of the invention includes a computer executable method for assisting in the design of a logic circuit, the method includes the steps of: acquiring a logic circuit description data, generating, based on the acquired logic circuit description data, a first netlist that is logically integrated with a first frequency, generating, based on the acquired logic circuit description data, a second netlist that is logically integrated with a second frequency that is higher than the first frequency, arranging logical operation elements and wiring the logical operation elements based on the first netlist, outputting a timing report related to execution timing for each of a plurality of blocks associated with the logical operational elements, extracting any block of the plurality of blocks, based on the outputted timing report, not satisfying a desired operational speed, replacing the first netlist with the second netlist for any extracted block when performing the arranging step for logical operation elements associated with any extracted block and wiring associated with any extracted block, and outputting another timing report after the arranging for the extracted blocks is performed, where at least one step is carried out on a computer device.

Another aspect of the invention includes a device for assisting in the design of a logic circuit, the device includes: first netlist generating means for generating, based on the acquired logic circuit description data, a first netlist logically integrated with a first frequency, second netlist generating means for generating, based on the acquired logic circuit description data, a second netlist logically integrated with a second frequency higher than the first frequency, place-and-route means for, based on the first netlist, arranging logical operation elements and wiring the logical operation elements, timing report outputting means for outputting a timing report related to execution timing for each of a plurality of blocks associated with the logical operational elements, block extracting means for extracting, based on the outputted timing report, any block not satisfying a desired operational speed, and netlist replacing means for replacing the first netlist with the second netlist for any extracted block, where the place-and-route means arrange, based on the second netlist, logical operation elements associated with any extracted block and wiring associated with any extracted block, and where the outputting means outputting output another timing report after place-and route means perform the arrangement for the extracted blocks.

Another aspect of the invention includes an article of manufacture tangibly embodying non-transitory computer readable instructions, which when executed on a computer device cause the computer device to carry out the steps of a method for assisting in the design of a logic circuit, the method includes the steps of: acquiring a logic circuit description data, generating, based on the acquired logic circuit description data, a first netlist that is logically integrated with a first frequency, generating, based on the acquired logic circuit description data, a second netlist that is logically integrated with a second frequency that is higher than the first frequency, arranging logical operation elements and wiring the logical operation elements based on the first netlist, outputting a timing report related to execution timing for each of a plurality of blocks associated with the logical operational elements, extracting any block of the plurality of blocks, based on the outputted timing report, not satisfying a desired operational speed, replacing the first netlist with the second netlist for any extracted block when performing the arranging step for logical operation elements associated with any extracted block and wiring associated with any extracted block, and outputting another timing report after the arranging for the extracted blocks is performed, where at least one step is carried out on a computer device.

BRIEF DESCRIPTION OF THE DRAWINGS

FIG. 6 displays a diagram showing a timing report for a specific block in the logic circuit design assistance device in an embodiment of the present invention.

DETAILED DESCRIPTION OF THE PREFERRED EMBODIMENT

There are problems with the approach suggested by prior art in this field. For instance, Japanese Patent Publication No. 2006-163822 does not mention setting a frequency for the logical synthesis, but logical synthesis is often performed using a higher frequency to avoid the occurrence of critical paths during the design process. However, because logical synthesis is performed at a higher frequency, there is an assumption that the gate size of the semiconductor integrated circuit will be unnecessarily large, and there is a possibility that a logical circuit consuming more power will be designed. These factors are contrary to the demands of an era calling for smaller sizes and increased power savings.

Also, by changing the arrangement of logical operation elements and the wiring between these logical operation elements based on a netlist generated by logical synthesis, it may be possible to get timing delays to converge and reduce power consumption. However, repeated trial and error is required to get the timing to converge, and the logical synthesis sometimes has to be reworked and performed again. This makes it difficult to reduce design times.

In view of these circumstances, the purpose of the present invention is to provide a method for optimizing a netlist used in the logic circuit design of a semiconductor integrated circuit to shorten design times, a device for assisting in the design of a logic circuit using this method, and a computer program executable by this device.

In order to achieve this purpose, the first aspect of the present invention is a method executable by a device for assisting in the design of a logic circuit, in which the method includes the steps of: acquiring logic circuit description data, generating a first netlist logically integrated with a first frequency based on the acquired logic circuit description data, generating a second netlist logically integrated with a second frequency higher than the first frequency based on the acquired logic circuit description data, arranging logical operation elements and wiring the logical operation elements based on the first netlist, outputting a timing report related to the execution timing for each block divided into a predetermined wiring unit, extracting any block not satisfying the desired operational speed based on the outputted timing report, and replacing the first netlist with the second netlist for any extracted block. Some or all of the arrangement of logical operation elements and the wiring of the logical operation elements is performed based on the second netlist, and output of a timing report is performed again.

The second aspect of the present invention is preferably the method in the first aspect, in which the blocks are configured as logical operation elements and wiring between logical operation elements interposed between a flip-flop circuit to which signals are inputted and a flip-flop circuit from which signals are outputted.

The third aspect of the present invention is preferably the method in the first or second aspect further including the step of: generating a reference table associated with the first netlist and the second netlist for each block, in which the reference table for an extracted block is referenced as key information to replace the first netlist corresponding to the extracted block with the second netlist corresponding to the block.

In order to achieve this purpose, the fourth aspect of the present invention is a device for assisting in the design of a logic circuit including: description data acquiring means for acquiring logic circuit description data, first netlist generating means for generating a first netlist logically integrated with a first frequency based on the acquired logic circuit description data, second netlist generating means for generating a second netlist logically integrated with a second frequency higher than the first frequency based on the acquired logic circuit description data, place-and-route means for arranging logical operation elements and wiring the logical operation elements based on the first netlist, timing report outputting means for outputting a timing report related to the execution timing for each block divided into a predetermined wiring unit, block extracting means for extracting any block not satisfying the desired operational speed based on the outputted timing report, and netlist replacing means for replacing the first netlist with the second netlist for any extracted block, the place-and-route means arranging some or all of the logical operation elements and wiring some or all of the logical operation elements based on the second netlist, and the timing report outputting means outputting another timing report.

The fifth aspect of the present invention is preferably the device in the fourth aspect, in which the blocks are configured as logical operation elements and wiring between logical operation elements interposed between a flip-flop circuit to which signals are inputted and a flip-flop circuit from which signals are outputted.

The sixth aspect of the present invention is preferably the method in the fourth or fifth aspect further including a reference table generating means for generating a reference table associated with the first netlist and the second netlist for each block, the netlist replacing means referencing the reference table for an extracted block as key information to replace the first netlist corresponding to the extracted block with the second netlist corresponding to the block.

In order to achieve this purpose, the seventh aspect of the present invention is a computer program executable by a device for assisting in the design of a logic circuit, the computer program enabling the device to function as: first netlist generating means for generating a first netlist logically integrated with a first frequency based on the acquired logic circuit description data, second netlist generating means for generating a second netlist logically integrated with a second frequency higher than the first frequency based on the acquired logic circuit description data, place-and-route means for arranging logical operation elements and wiring the logical operation elements based on the first netlist, timing report outputting means for outputting a timing report related to the execution timing for each block divided into a predetermined wiring unit, block extracting means for extracting any block not satisfying the desired operational speed based on the outputted timing report, and netlist replacing means for replacing the first netlist with the second netlist for any extracted block, the place-and-route means functioning so as to arrange some or all of the logical operation elements and wiring some or all of the logical operation elements based on the second netlist, and the timing report outputting means functioning so as to output another timing report.

The eighth aspect of the present invention is preferably the computer program in the seventh aspect, in which the blocks are configured as logical operation elements and wiring between logical operation elements interposed between a flip-flop circuit to which signals are inputted and a flip-flop circuit from which signals are outputted.

The ninth aspect of the present invention is preferably the computer program in the seventh or eighth aspect, the computer program enabling the device to function as a reference table generating means for generating a reference table associated with the first netlist and the second netlist for each block, the netlist replacing means referencing the reference table for an extracted block as key information to replace the first netlist corresponding to the extracted block with the second netlist corresponding to the block.

In the present invention, a first netlist is generated which is logically integrated with a first frequency based on the acquired logic circuit description data, and a second netlist is generated which is logically integrated with a second frequency higher than the first frequency based on the acquired logic circuit description data. In the placement-and-routing step for the logical operation elements, placement and routing is performed as a general rule based on the first netlist. However, by using the second netlist on blocks with critical timing, the netlist can be optimized in the logical synthesis step without having to be reworked, and the overall time required to design a logical circuit can be reduced. Because logical operation elements with a faster speed than required can be placed, the overall gate size of a semiconductor integrated circuit does not have to be increased, and excessive power consumption can be avoided in advance.

The following is an explanation with reference to the drawings of a logic circuit design assistance device in an embodiment of the present invention which assists in the design of a logic circuit. However, the present embodiment does not limit the present invention in the scope of the claims. Also, all combinations of characteristics explained in the embodiment are not necessarily required in the technical solution of the present invention.

The present invention can be embodied in many ways, and should not be construed as limited to the description of the embodiment. Identical elements are denoted by the same reference numerals throughout the embodiment.

In the explanation of the following embodiment, a device is used to introduce a computer program to a computer system. However, as should be clear to those skilled in the art, some of the present invention can be embodied as a computer program that can be executed by a computer. Therefore, the present invention can be embodied as hardware, such as a logic circuit design assistance device for assisting in the design of a logic circuit, as software, or as a combination of hardware and software. The computer program can be stored on a computer-readable storage device such as a hard disk, DVD, CD, optical storage device, or magnetic storage device.

In the embodiment of the present invention, a first netlist is generated which is logically integrated with a first frequency based on the acquired logic circuit description data, and a second netlist is generated which is logically integrated with a second frequency higher than the first frequency based on the acquired logic circuit description data. In the placement-and-routing step for the logical operation elements, placement and routing is performed as a general rule based on the first netlist. However, by using the second netlist on blocks with critical timing, the netlist can be optimized in the logical synthesis step without having to be reworked, and the overall time required to design a logical circuit can be reduced. Because logical operation elements with a faster speed than required can be placed, the overall gate size of a semiconductor integrated circuit does not have to be increased, and excessive power consumption can be avoided in advance.

Figure 1:
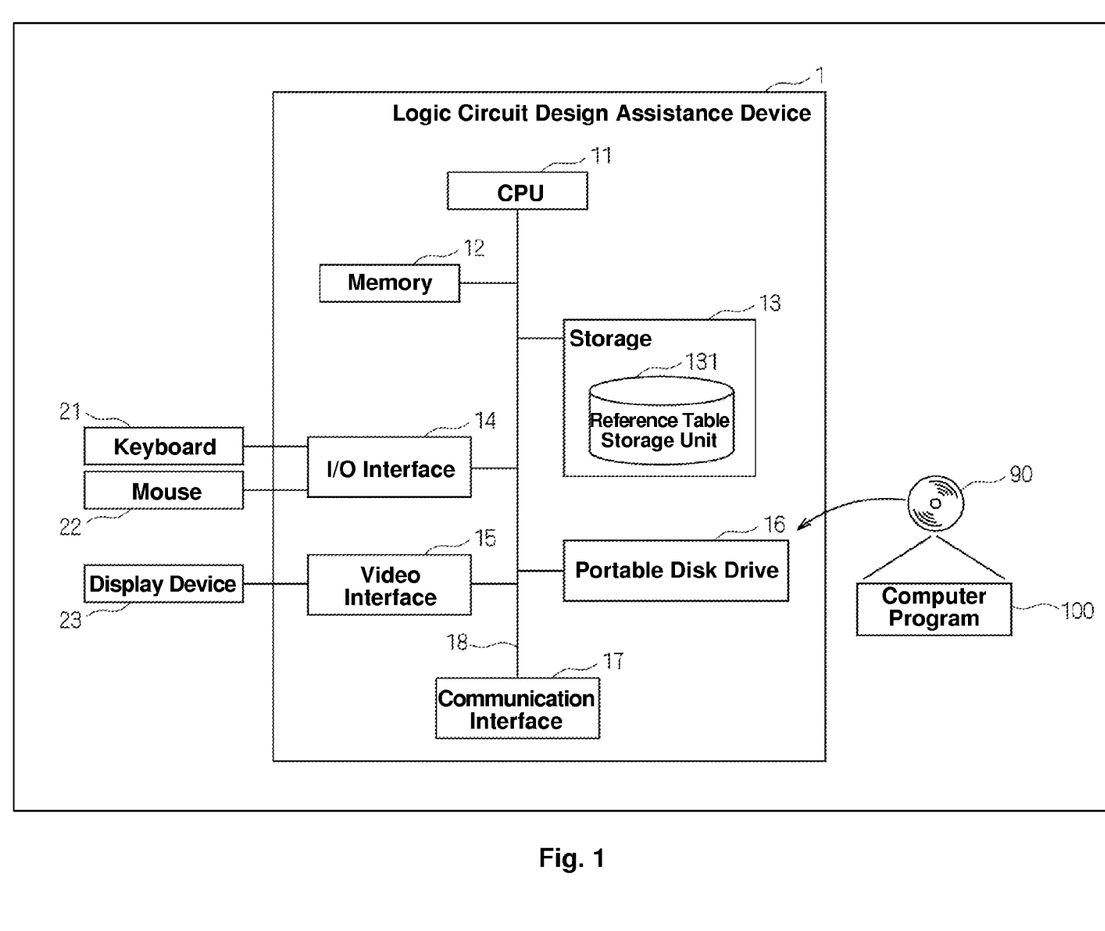
FIG. 1 displays a block diagram schematically illustrating the configuration of the logic circuit design assistance device in an embodiment of the present invention.

FIG. 1 is a block diagram schematically illustrating the configuration of the logic circuit design assistance device in an embodiment of the present invention. The logic circuit design assistance device 1 in this embodiment includes, at the very least, a central processing unit (CPU) 11, memory 12, a storage device 13, an I/O interface 14, a video interface 15, a portable disk drive 16, a communication interface 17, and an internal bus 18 connecting these hardware components.

The CPU 11 is connected to each hardware component in the logic circuit design assistance device 1 via an internal bus 18 in order to control the operations of these hardware components, and to execute various software functions in accordance with a computer program 100 stored in the storage device 13. The memory 12 is non-volatile memory such as SRAM or SDRAM. When the computer program 100 is executed, the load module is deployed in the memory, and the temporary data generated when the computer program 100 has been executed is stored in the memory.

The storage device 13 can be an internal fixed storage device (hard disk) or ROM. The computer program 100 stored in the storage device 13 is downloaded from a portable storage medium 90 such as a DVD or CD-ROM containing information such as programs and data using a portable disk drive 16, and is deployed from the storage device 13 and executed in the memory 12. It may, of course, be a computer program downloaded from an external computer connected via a communication interface 17.

The storage device 13 includes a reference table storage unit 131 for storing reference tables for each block in the logic circuit, in which a first netlist generated by logical synthesis of the logic circuit using a first frequency, and a second netlist generated by a second netlist generated by logical synthesis of the logic circuit using a second frequency higher than the first frequency are associated with identification information identifying the logical operation element (cell). A block is a divided wiring unit. In this embodiment, each block is configured as logical operation elements (cells) and wiring between logical operation elements (cells) interposed between a flip-flop circuit to which signals are inputted and a flip-flop circuit from which signals are outputted.

The communication interface 17 is connected to the internal bus 18, and to an external network such as the Internet, a LAN or a WAN so as to be able to exchange data with external computers.

The I/O interface 14 is connected to input devices such as a keyboard 21 and a mouse 22 in order to receive the input of data. The video interface 15 is connected to a display device 23 such as a CRT display or a liquid crystal display to display predetermined images.

Figure 2:
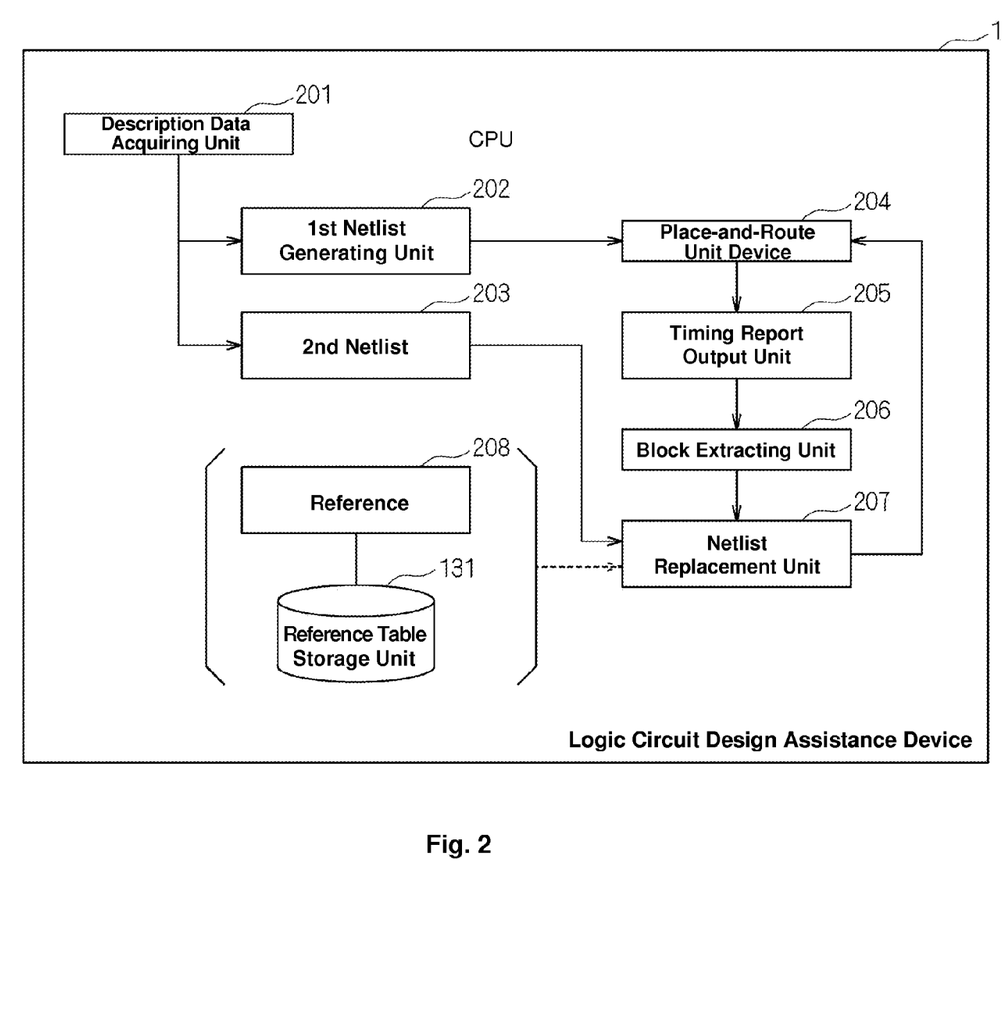
FIG. 2 displays a function block diagram of the logic circuit design assistance device in an embodiment of the present invention.

FIG. 2 is a function block diagram of the logic circuit design assistance device 1 in the embodiment of the present invention. The description data acquiring unit 201 in the logic circuit design assistance device 1 in FIG. 2 acquires logical circuit description data as data for a logical synthesis. The acquired logic circuit description data is, for example, RTL (register transfer level) source code.

Figure 3:
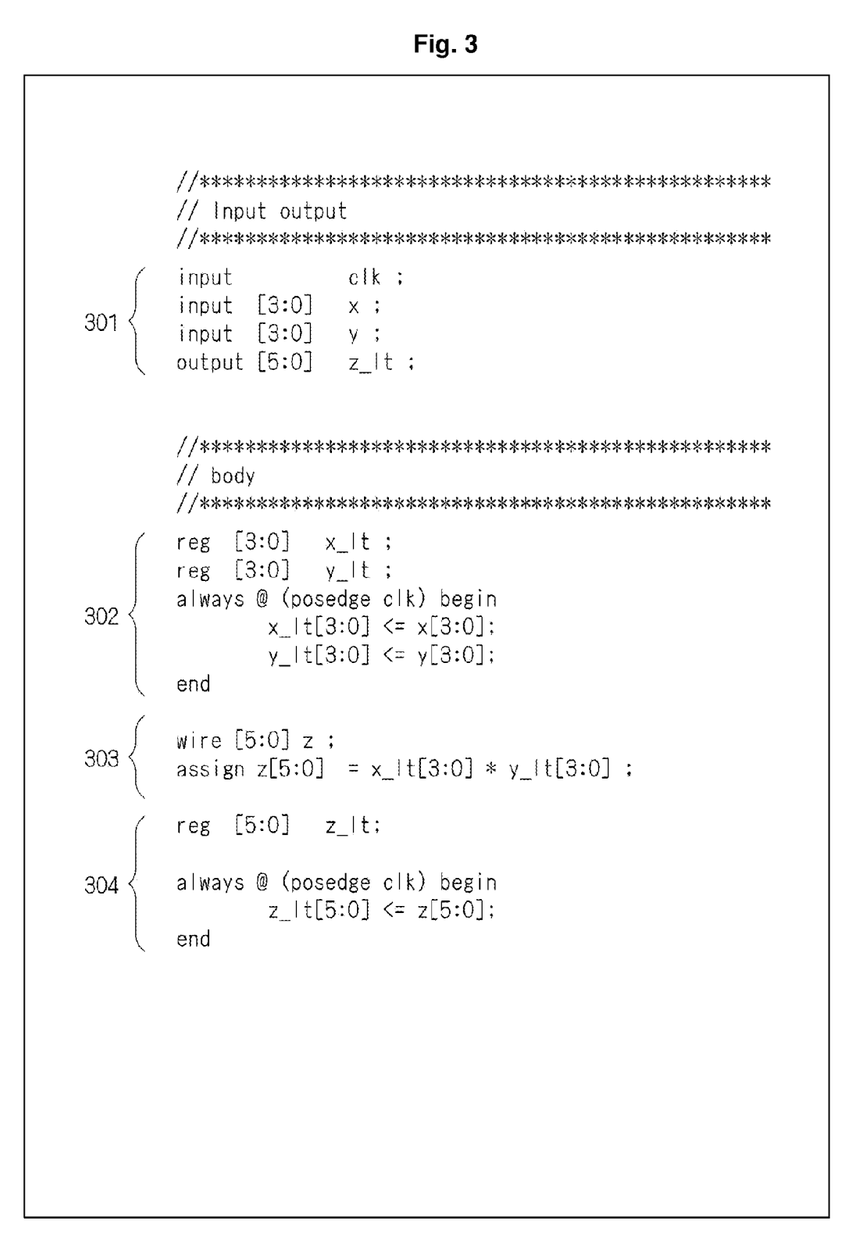
FIG. 3 displays a diagram showing RTL source code for the logic circuit design assistance device in an embodiment of the present invention.

FIG. 3 is a diagram showing RTL source code for the logic circuit design assistance device 1 in the embodiment of the present invention. The RTL source code in FIG. 3 is source code constituting a basic multiplier, and the source code 301 indicates the output of the results of multiplying input x and input y to z_lt.

More specifically, source code 302 indicates the simultaneous extraction and input of four-bit input x and input y to the flip-flop circuit on the input side. Source code 303 indicates the output of the results of multiplying input x and input y to output z as wiring results for the logic circuit. Source code 304 indicates the output of six-bit output z_lt to the flip-flop circuit on the output end.

Figure 4A:
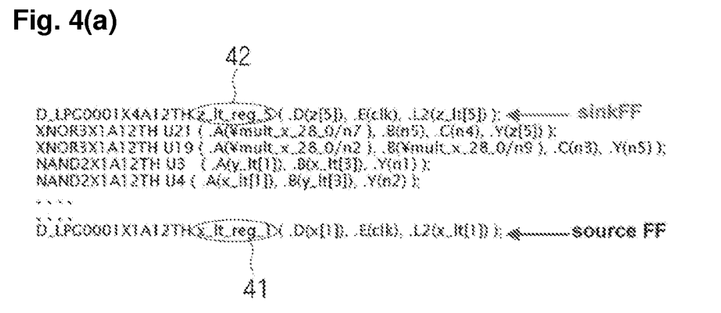
FIG. 4(a) displays a diagram showing a first netlist for the logic circuit design assistance device in an embodiment of the present invention.
Figure 4B:
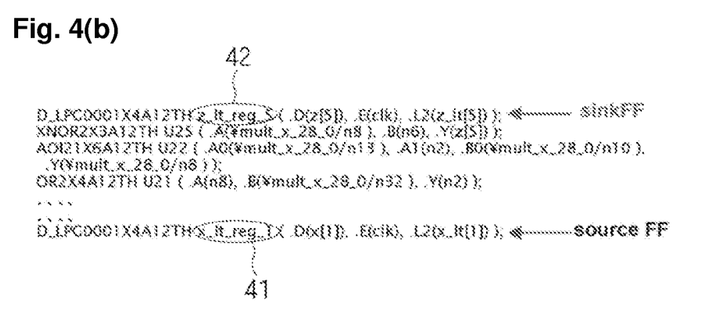
FIG. 4(b) displays a diagram showing a second netlist for the logic circuit design assistance device in an embodiment of the present invention.

Returning to FIG. 2, the first netlist generating unit 202 performs logical synthesis at a first frequency based on the acquired RTL source code (logic circuit description data) to generate a first netlist. Similarly, the second netlist generating unit 203 performs logical synthesis at a second frequency higher than the first frequency based on the acquired logic circuit description data to generate a second netlist. FIG. 4 is a diagram showing a first netlist and a second netlist for the logic circuit design assistance device 1 in the embodiment of the present invention.

FIG. 4 (a) shows a first netlist generated by performing logical synthesis at a relatively low frequency, and FIG. 4 (b) shows a second netlist generated by performing logical synthesis at a relatively high frequency. When FIG. 4 (a) and FIG. 4 (b) are compared, the first identification information 41 identifying the flip-flop circuit on the input side, and the second identification information 42 identifying the flip-flop circuit on the output side match in the first netlist and the second netlist. In other words, these indicate netlists for the same block. The arrangement and number of logical operation elements (cells) differ between the flip-flop circuit on the input end and the flip-flop circuit on the output end, that is, between the first identification information 41 and the second identification information 42.

Returning to FIG. 2, the place-and-route unit 204 arranges logical operation elements and wires the logical operation elements based on the generated first netlist. More specifically, the elements are automatically arranged and automatically wired by a placement tool in accordance with constraints. The timing report output unit 205 outputs a timing report related to the execution timing for each block, which is divided into predetermined wiring units.

Figure 5:
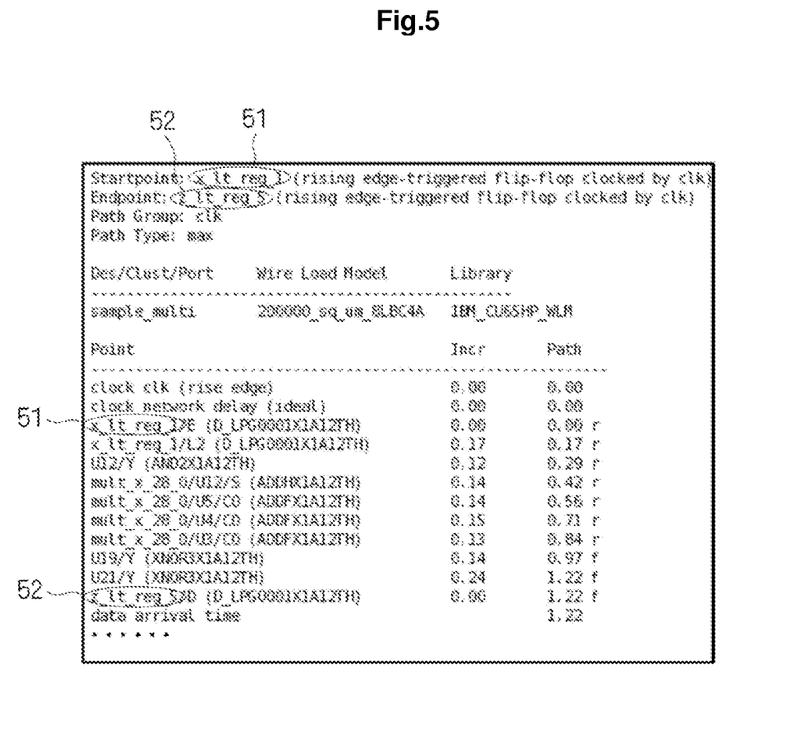
FIG. 5 displays a diagram showing a timing report for a logic circuit design assistance device in an embodiment of the present invention.

A timing report is a report which adds up the time required for each logical operation element to perform processing in each block. FIG. 5 is a diagram showing a timing report for the logic circuit design assistance device 1 in the embodiment of the present invention. FIG. 5 shows a timing report outputted for a single block.

As shown in FIG. 5, the time required for each logical operation element to perform processing is collected, starting the time count from the first identification information 51 identifying the flip-flop circuit on the input side, and ending the time count with the second identification information 52 identifying the flip-flop circuit on the output side. When the cumulative operation processing time greatly diverges (exceeds) the previously estimated time, it is determined that the processing in the first netlist cannot be completed in the previously estimated time for the block in the outputted timing report, and that the block is a timing-critical block. In the present invention, the timing of a timing-critical block is adjusted by replacing the first netlist with a second netlist obtained by performing logical synthesis at a higher frequency. More specifically, the difference between the previously estimated time and the cumulative operation processing time is calculated, and a block is considered a timing-critical block when the calculated difference is a negative value.

Returning to FIG. 2, the block extracting unit 206 extracts a block that does not satisfy the desired operating speed based on the outputted timing report. Then, the netlist replacing unit 207 replaces the first netlist with the second netlist in the extracted block.

FIG. 6 is a diagram showing a timing report for a specific block in the logic circuit design assistance device 1 in the embodiment of the present invention. In the block shown in FIG. 6, the difference 63 between the cumulating operation processing time and the previously estimated time is a negative value (minus), so it takes longer than the previously estimated time to perform the operation processing. In other words, the processing does not end within the previously estimated time, an operating timing discrepancy (delay, etc.) occurs, and the logical operation may not be executed properly.

Therefore, the first netlist is replaced with the second netlist in blocks having a negative value for the difference 63. More specifically, the first netlist and the second netlist corresponding to the extracted block are retrieved using the first identification information 51 identifying the flip-flop circuit on the input side and the second identification information 52 identifying the flip-flop circuit on the output side as key information. The first netlist corresponding to the extracted block is then replaced with the second netlist corresponding to the extracted block.

Of course, a reference table can be generated which associates the first netlist and second netlist of each block and the reference table can be stored in the reference table storage unit 131 of the storage device 13 in order to accelerate the operation processing time. The reference table generating unit 208 shown in FIG. 2 generates a reference table associated the first netlist and the second netlist of each block, and stores the reference table in the reference table storage unit 131 of the storage device 13.

When a reference table is to be used, the netlist replacing unit 207 references the reference table using the extracted block as key information, and the first netlist corresponding to the extracted block is replaced by the second netlist corresponding to the extracted block.

Figure 7A:
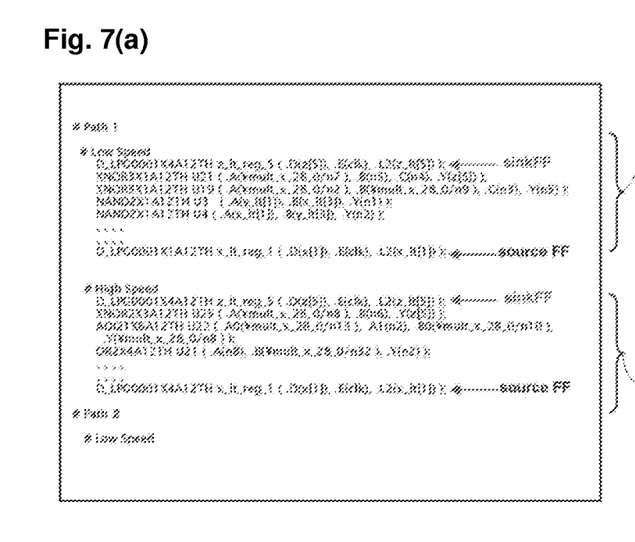
FIG. 7(a) displays a diagram showing a reference table stored in the reference table storage unit of the logic circuit design assistance device an embodiment of the present invention.

FIG. 7 is a diagram showing a reference table stored in the reference table storage unit 131 of the logic circuit design assistance device 1 in the embodiment of the present invention. In the reference table shown in FIG. 7 (a), the first netlist 71 generated by logical synthesis using a first frequency (low frequency) is associated with the second netlist 72 generated by logical synthesis using a second frequency (high frequency) for each block (described as a "path" in FIG. 7).

Figure 7B:
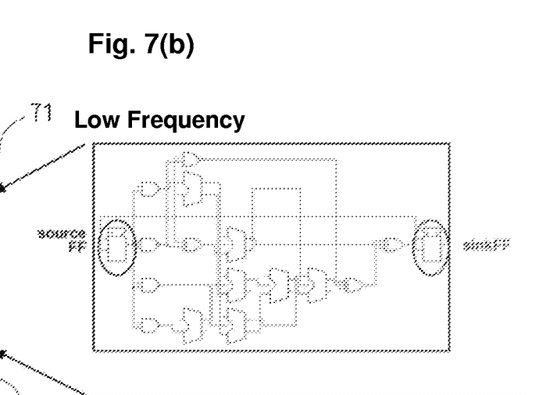
FIG. 7(b) displays a diagram showing a reference table stored in the reference table storage unit of the logic circuit design assistance device an embodiment of the present invention.
Figure 7C:
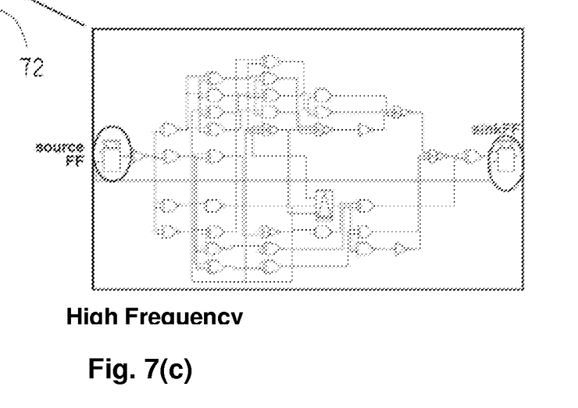
FIG. 7(c) displays a diagram showing a reference table stored in the reference table storage unit of the logic circuit design assistance device an embodiment of the present invention.

As shown in FIG. 7 (b), it is not difficult to wire the logical operation elements during logical synthesis at a low frequency when the number of elements is small. However, as shown in FIG. 7 (c), it is difficult to wire the logical operation elements during logical synthesis at a high frequency when the number of elements is fairly large. A reference table is generated which associates both netlists for each block, and a process is not required to retrieve all generated netlists by storing them beforehand. As a result, the first netlist 71 can be replaced by the second netlist 72 of an extracted block without an excessive operation processing load.

Figure 8:
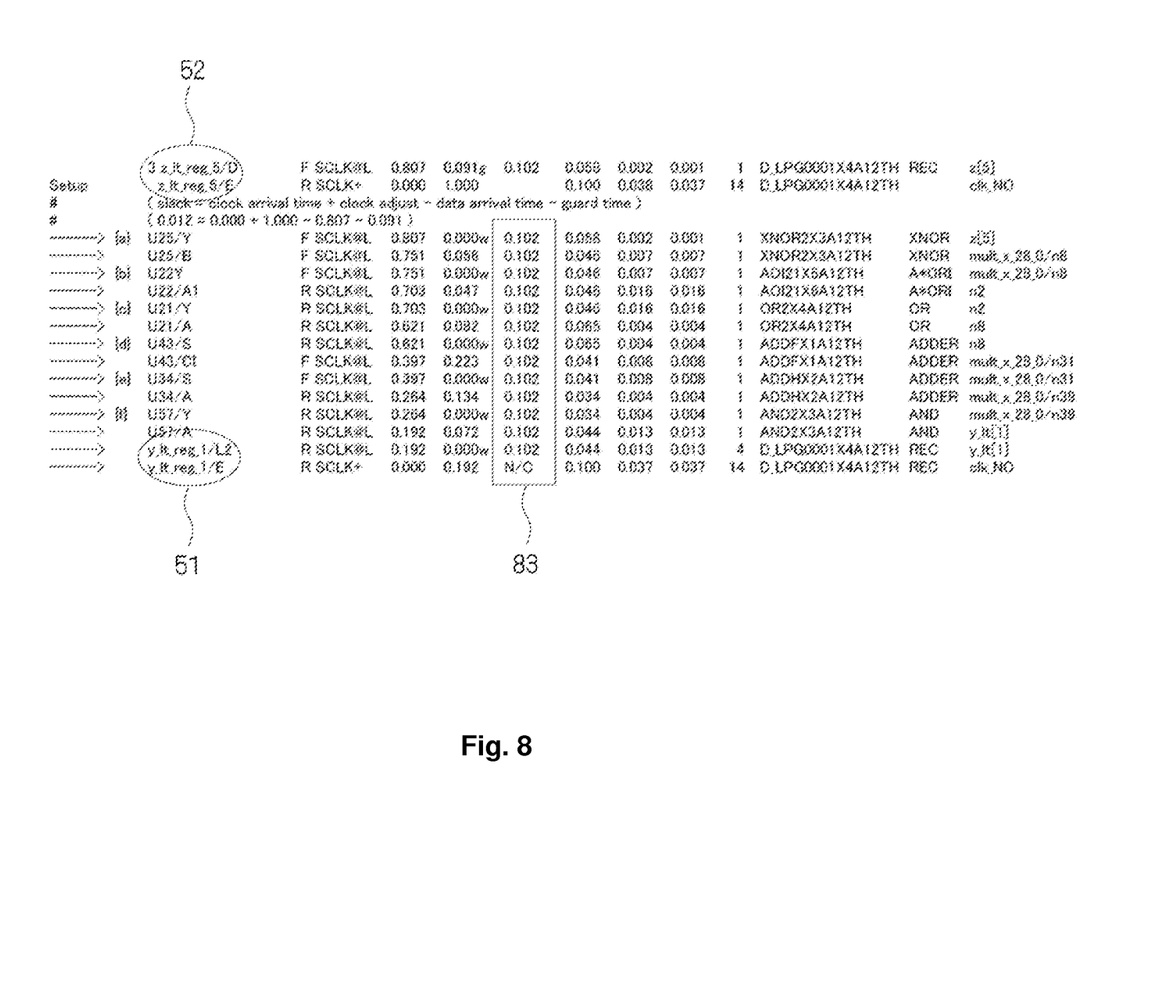
FIG. 8 displays a diagram showing a timing report for a logic circuit design assistance device in the embodiment of the present invention in which the second netlist has been replaced.

FIG. 8 is a diagram showing a timing report for a logic circuit design assistance device 1 in the embodiment of the present invention in which the second netlist has been replaced. Unlike FIG. 6, the difference 83 between the cumulative operation processing time and the previously estimated time is not a negative value (minus), and so it is determined that the processing can be completed within the previously estimated time.

Figure 9:
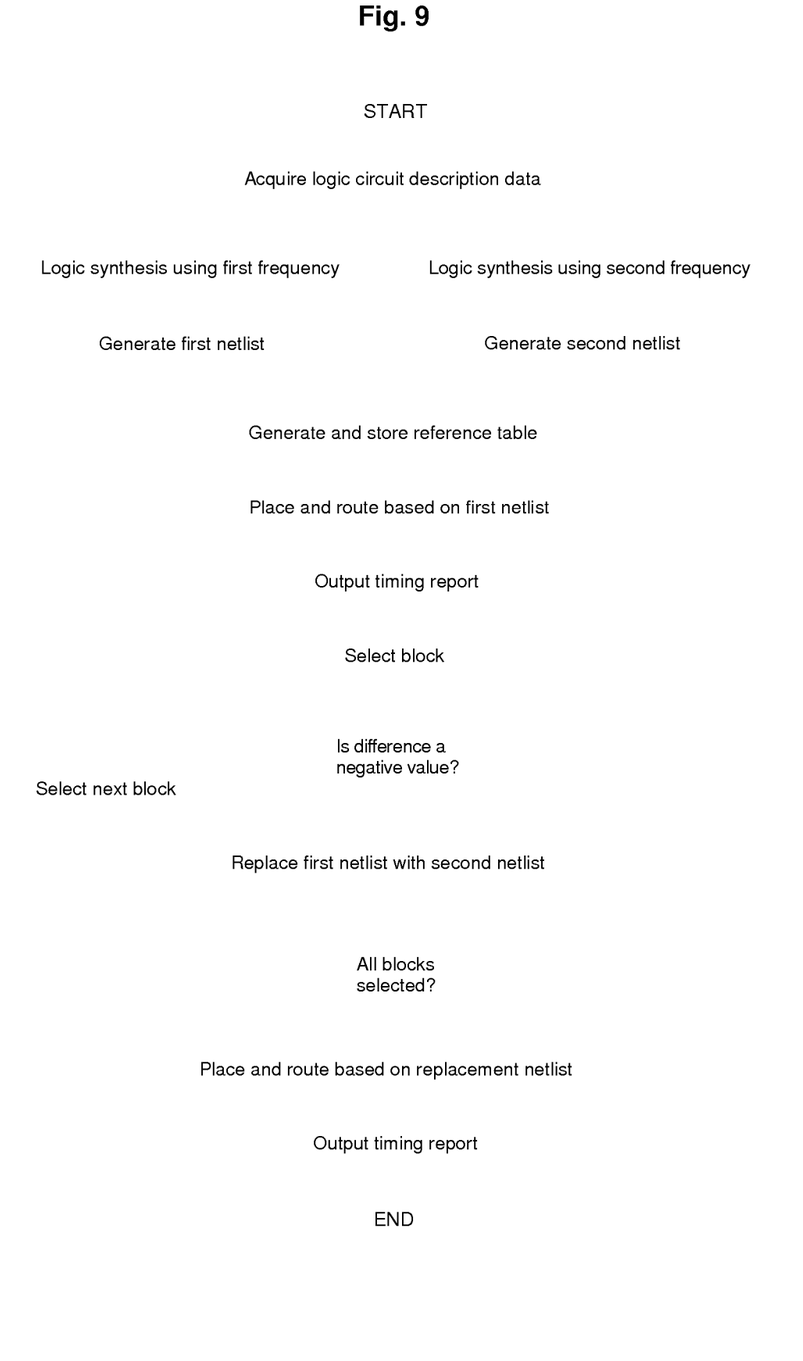
FIG. 9 displays a flowchart showing the processing steps performed by the CPU in the logic circuit design assistance device in the embodiment of the present invention.

FIG. 9 is a flowchart showing the processing steps performed by the CPU 11 in the logic circuit design assistance device 1 in the embodiment of the present invention. The CPU 11 in the logic circuit design assistance device 1 acquires logic circuit description data as data for logical synthesis (Step S901). The acquired logic circuit description data can be, for example, RTL (register transfer level) source code.

The CPU 11 performs logical synthesis using a first frequency based on the acquired logical circuit description data (Step S902), and generates a first netlist (Step S903). Similarly, the CPU 11 performs logical synthesis using a second frequency higher than the first frequency based on the acquired logical circuit description data (Step S904), and generates a second netlist (Step S905). The CPU 11 generates and stores a reference table associating the first netlist and the second netlist of each block configured as logical operation elements and wiring between logical operation elements interposed between a flip-flop circuit on the input side and a flip-flop circuit on the output side (Step S906).

The CPU 11 arranges logical operation elements and wires the logical operation elements based on the generated first netlist (Step S907). More specifically, the elements are automatically arranged and automatically wired by a placement tool in accordance with constraints. The CPU 11 outputs a timing report related to the execution timing for each block (Step S908).

The CPU 11 selects a block (Step S909), and determines whether or not the difference between the cumulative operation processing time in the outputted timing report and the previously estimated time for the selected block is a negative value (Step S910). When the CPU 11 determines that the difference is a negative value (Step S910: YES), the CPU 11 replaces the first netlist with the second netlist (Step S911).

When the CPU 11 determines that the difference is not a negative value (Step S910: NO), the CPU 11 skips Step S911, and determines whether or not all of the blocks have been selected (Step S912). When the CPU 11 determines that there is a block that has still not been selected (Step S912: NO), the CPU 11 selects the next block (Step S913), the processing returns to Step S910, and the processing described above is repeated.

When the CPU 11 determines that all of the blocks have been selected (Step S912: YES), the CPU 11 arranges some or all of the logical operation elements and wires some or all of the logical operation elements based on a netlist replaced by the second netlist (Step S914), and outputs another timing report (Step S915).

In the embodiment of the present invention described above, a first netlist is generated which is logically integrated with a first frequency (low frequency) based on the acquired logic circuit description data, and a second netlist is generated which is logically integrated with a second frequency (high frequency) higher than the first frequency based on the acquired logic circuit description data.

In the placement-and-routing step for the logical operation elements, placement and routing is performed as a general rule based on the first netlist. However, by using the second netlist on blocks with critical timing, the netlist can be optimized in the logical synthesis step without having to be reworked, and the overall time required to design a logical circuit can be reduced. Because logical operation elements with a faster speed than required can be placed, the overall gate size of a semiconductor integrated circuit does not have to be increased, and excessive power consumption can be avoided in advance.

The present invention is not restricted to this example. Several different types of alterations and modifications are possible within the scope of the present invention.

What we claim is:

1. A computer executable method for assisting in the design of a logic circuit, the method comprising the steps of:
   acquiring a logic circuit description data;
   generating, based on the acquired logic circuit description data, a first netlist that is logically integrated with a first frequency;
   generating, based on the acquired logic circuit description data, a second netlist that is logically integrated with a second frequency that is higher than the first frequency;
   arranging logical operation elements and wiring the logical operation elements based on the first netlist;
   outputting a timing report related to execution timing for each of a plurality of blocks associated with the logical operational elements;
   extracting any block of the plurality of blocks, based on the outputted timing report, not satisfying a desired operational speed;
   replacing the first netlist with the second netlist for any extracted block when performing the arranging step for logical operation elements associated with any extracted block and wiring associated with any extracted block; and
   outputting another timing report after the arranging for the extracted blocks is performed,
   wherein at least one step is carried out on a computer device.

2. The method according to claim 1, wherein each of the plurality of blocks is configured as logical operation elements and wiring between other logical operation elements interposed between a flip-flop circuit to which signals are inputted and a flip-flop circuit from which signals are outputted.

3. The method according to claim 1 further comprising the step of: generating a reference table associated with the first netlist and the second netlist for each of the plurality of blocks, the reference table for an extracted block being referenced as key information to replace the first netlist corresponding to the extracted block with the second netlist corresponding to the extracted block.

4. A device for assisting in the design of a logic circuit comprising:
   description data acquiring means for acquiring logic circuit description data;
   first netlist generating means for generating, based on the acquired logic circuit description data, a first netlist logically integrated with a first frequency;
   second netlist generating means for generating, based on the acquired logic circuit description data, a second netlist logically integrated with a second frequency higher than the first frequency;
   place-and-route means for, based on the first netlist, arranging logical operation elements and wiring the logical operation elements;
   timing report outputting means for outputting a timing report related to execution timing for each of a plurality of blocks associated with the logical operational elements;
   block extracting means for extracting, based on the outputted timing report, any block not satisfying a desired operational speed; and netlist replacing means for replacing the first netlist with the second netlist for any extracted block, wherein the place-and-route means arrange, based on the second netlist, logical operation elements associated with any extracted block and wiring associated with any extracted block, and wherein the outputting means outputting output another timing report after place- and route means perform the arrangement for the extracted blocks.

5. The device according to claim 4, wherein each of the plurality of blocks is configured as logical operation elements and wiring between other logical operation elements interposed between a flip-flop circuit to which signals are inputted and a flip-flop circuit from which signals are outputted.

6. The device according to claim 4 further comprising: a reference table generating means for generating a reference table associated with the first netlist and the second netlist for each of the plurality of blocks, the netlist replacing means referencing the reference table for an extracted block as key information to replace the first netlist corresponding to the extracted block with the second netlist corresponding to the extracted block.

7. An article of manufacture tangibly embodying non-transitory computer readable instructions, which when executed on a computer device cause the computer device to carry out the steps of a method for assisting in the design of a logic circuit, the method comprising the steps of:

acquiring a logic circuit description data;

generating, based on the acquired logic circuit description data, a first netlist that is logically integrated with a first frequency;

generating, based on the acquired logic circuit description data, a second netlist that is logically integrated with a second frequency that is higher than the first frequency;

arranging logical operation elements and wiring the logical operation elements based on the first netlist;

outputting a timing report related to execution timing for each of a plurality of blocks associated with the logical operational elements;

extracting any block of the plurality of blocks, based on the outputted timing report, not satisfying a desired operational speed;

replacing the first netlist with the second netlist for any extracted block when performing the arranging step for logical operation elements associated with any extracted block and wiring associated with any extracted block; and outputting another timing report after the arranging for the extracted blocks is performed, wherein at least one step is carried out on a computer device.

8. The article according to claim 7, wherein each of the plurality of blocks is configured as logical operation elements and wiring between other logical operation elements interposed between a flip-flop circuit to which signals are inputted and a flip-flop circuit from which signals are outputted.

9. The article according to claim 8, wherein the method further comprises:

generating a reference table associated with the first netlist and the second netlist for each of the plurality of blocks, the reference table for an extracted block being referenced as key information to replace the first netlist corresponding to the extracted block with the second netlist corresponding to the extracted block.

* * * * *